US006967467B2

(12) United States Patent
Riley et al.

(10) Patent No.: US 6,967,467 B2
(45) Date of Patent: Nov. 22, 2005

(54) METHOD AND APPARATUS FOR CURRENT DELEGATION TO A PLURALITY OF LOADS

(75) Inventors: Marc B. Riley, Lawrenceville, GA (US); Taneka L. Frazier, Lilburn, GA (US); Martin H. Ramsden, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 250 days.

(21) Appl. No.: 10/646,329

(22) Filed: Aug. 22, 2003

(65) Prior Publication Data

US 2005/0040795 A1 Feb. 24, 2005

(51) Int. Cl.[7] .................. H01M 10/44; H01M 10/46

(52) U.S. Cl. ................................... 320/135

(58) Field of Search ................ 320/116, 127, 128, 320/137, 138, 135; 307/11, 31, 35, 38, 39

(56) References Cited

U.S. PATENT DOCUMENTS

| 5,757,163 A | 5/1998 | Brotto et al. |
| 6,445,159 B1 * | 9/2002 | Ramsden .................... 320/119 |

* cited by examiner

Primary Examiner—Edward H. Tso
(74) Attorney, Agent, or Firm—Hisashi D. Watanabe

(57) ABSTRACT

A charging circuit is provided for coupling a power source to a plurality of loads. The circuit includes a controller that continually senses the output voltage of the power source. The controller may also decouple the power source from the loads to measure the open circuit voltage of the power source. Once the open circuit voltage is known, the controller establishes a threshold voltage that is slightly below the open circuit voltage of the power supply. The controller then begins delivering current to one of the loads by way of a current regulator. Whenever the power source voltage is below the threshold voltage, the controller reduces the current flowing through the current regulator. When the power source voltage is above the threshold voltage, the controller increases the current flowing through the current regulator. In so doing, the charging circuit simultaneously charges both loads, thereby reducing overall charge time.

14 Claims, 4 Drawing Sheets

METHOD AND APPARATUS FOR CURRENT DELEGATION TO A PLURALITY OF LOADS

BACKGROUND

1. Technical Field

This invention relates generally to a battery charger for simultaneously charging multiple batteries, and more particularly to a method and apparatus for simultaneously charging multiple batteries loaded in multiple charging pockets of a charger via current delegation between the multiple pockets.

2. Background Art

Portable computers, personal digital assistants, cellular telephones, pagers, calculators, and other such electronic devices are commonplace in today's mobile society. One of the reasons portable electronic devices are so popular is that they provide a user with virtual freedom regarding the location of their use, as long as a source of power is readily available. Although these devices may be powered by plugging them into a standard AC outlet, AC power is often not convenient or readily available. Hence, their real portability and utility comes from rechargeable batteries.

Although battery technology has progressed greatly in recent decades, a single battery is sometimes unable to meet a user's demand. For example, many cellular telephone service providers are offering plans with 3000 plus minutes of talk time or more per month. Some business people talk on their cellular phones six or more hours per day. Typical cellular telephone batteries provide only three to four hours of talk time before needing to be recharged. Consequently, some users carry two or more batteries with them so that a spare is ready when the first battery dies. Further, to remain on the go, users now want shorter charge times in addition to extended battery life. They also want to be able to quickly charge two or more batteries at the same time.

One solution to the problem of how to quickly recharge two or more batteries is to charge two batteries serially. In other words, when the two batteries are placed in the same charger, the charger completely charges the first battery. The charger then instantly switches to the second battery and charges it. Total charging time is thus the charging time of one cell multiplied by the number of cells. Another solution to the problem with quickly recharging multiple batteries was to charge each battery in a charging system with its own power supply or charging system.

However, both solutions present problems. A problem with the first solution is that it is not efficient. The second solution requires a prohibitive amount of manufacturing costs, components and space. For these reasons, there is a need for an adaptive, multiple battery charging apparatus that allows simultaneous charging of multiple batteries with a single battery charging system

DETAILED DESCRIPTION OF THE INVENTION

Figure 1:
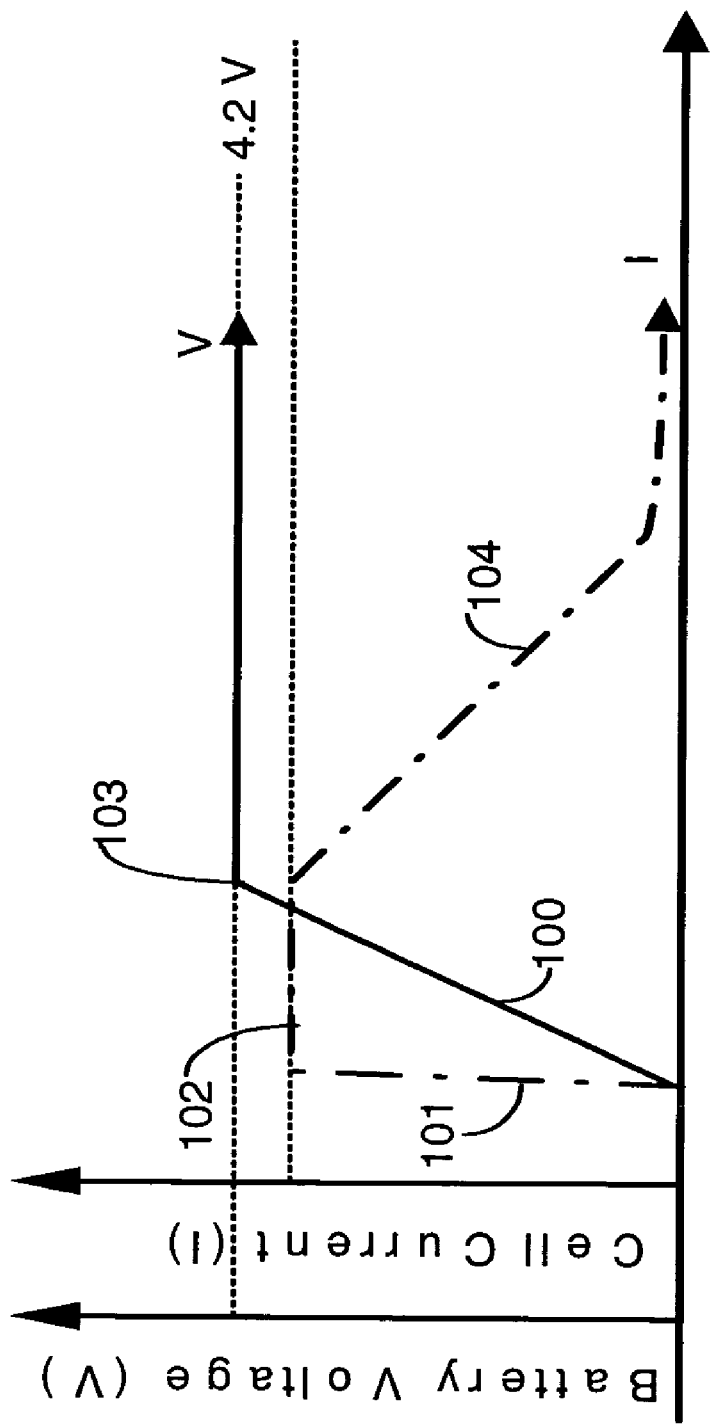
FIG. 1 illustrates a typical voltage and current profile associated with lithium based rechargeable batteries.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a method and apparatus for reducing the charge time of batteries in a charger. Typical chargers for portable electronic products, including pagers, personal data assistants, cellular telephones and radios, often include multiple pockets. A first pocket is provided for accommodating the portable electronic device having a battery coupled thereto. The second pocket accommodates a spare rechargeable battery that can be coupled to the portable electronic device at a later time. With two pockets, a user is able to charge his primary battery and a spare battery for later use.

As noted above, most prior art chargers charge batteries in the two pockets serially. In other words, they charge the primary battery pocket first. Once the primary battery has been fully charged, the charger switches to the second pocket to charge the spare battery. As it can take more than three hours for some chargers to charge an ordinary lithium battery, this serial process can take as much as six hours, depending upon the initial state of charge of the two batteries.

The present invention resolves this problem by delegating current from a power source to two pockets simultaneously. In one embodiment, the invention gives a first pocket, often holding the electronic device/battery combination, priority. The invention then allocates all possible current to the second (or remaining) pocket(s) without jeopardizing the first pocket priority.

Referring now to FIG. 1, illustrated therein is a typical voltage and current profile associated with lithium based rechargeable batteries. Line 100 represents the voltage of a lithium cell as it is being charged. The voltage ramps up while the charger delivers a predetermined current. Once the battery reaches its maximum voltage, typically 4.1 or 4.2 volts for single cell applications, the charger will begin to taper, or reduce, the current. Line 101 represents this charging current. One can see that the current is being delivered at its maximum value at segment 102. Once the battery voltage reaches its maximum, shown at vertex 103, the current begins to taper off. The tapering is shown as segment 104. For exemplary purposes, the maximum current is illustrated as 600 mA. This value may vary among chargers.

This invention takes advantage of the tapering current to charge two or more batteries simultaneously. When a primary battery in the front pocket reaches nearly full charge capacity, the current begins to taper. This tapering results in the current being delivered to the primary battery being less than the capacity of the power source. (This also occurs when the output capability of the power supply is greater than the optimum current required by the primary battery, thereby allowing simultaneous charging for a longer period of time.) This invention takes the difference between maximum current available from the power supply and current being delivered to the primary cell and delivers it to the spare cell. In so doing, this invention greatly reduces the time required to charge two batteries.

While lithium-based batteries exhibit a tapering current as shown in FIG. 1, they are well suited to the present invention. However, it will be clear to those of ordinary skill in the art that the invention could be equally applied to any load where current tapers as a function of time. If a pseudo-limit is employed, a means of sensing current, like a low-Ohm resistor for example, will need to be included with the circuit.

Figure 2:
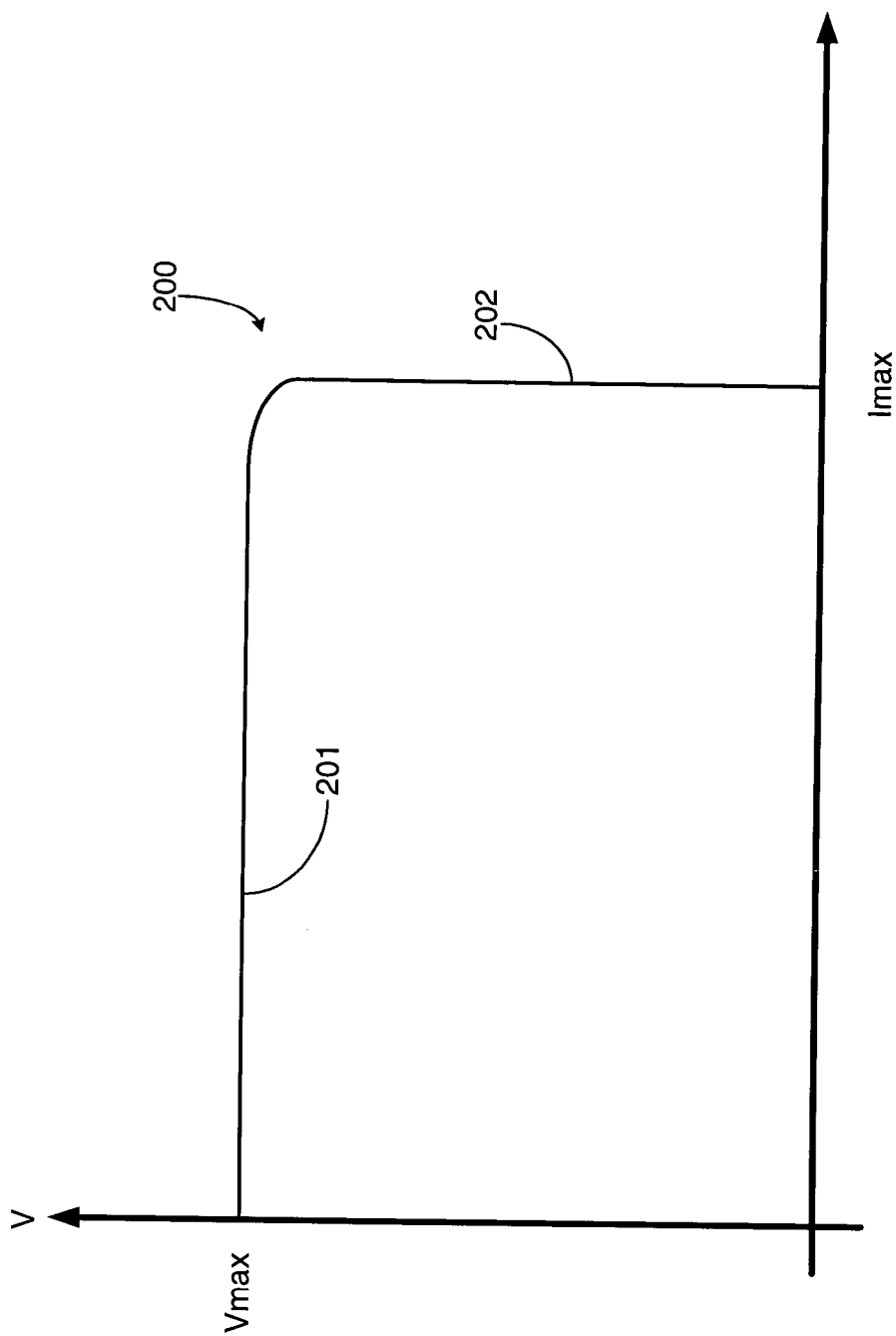
FIG. 2 illustrates the output characteristic of a constant-voltage-constant-current power supply.

By way of background, now referring now to FIG. 2, illustrated therein is the output characteristic 200 of a "constant-voltage-constant-current", or "CCCV", power supply. Such supplies are known in the art, as recited by U.S. Pat. No. 5,023,541, entitled "Power Supply Control Circuit Having Constant Voltage and Constant Current Modes", which is incorporated herein by reference. Another CCCV supply is taught in the application notes for the TL494 control IC manufactured by On-Semiconductor. Segment 201 illustrates a constant voltage of Vmax that is supplied for all load currents less than Imax. Once the load current attempts to exceed Imax, segment 202 represents the maximum current, Imax, which is delivered as the voltage tapers from Vmax to zero.

The present invention is well suited for use with a CCCV power supply, in that it takes advantage of the current limit of the power supply in delegating current. It will be clear to those of ordinary skill in the art, however, that the invention is not so limited. It is applicable to most any power supply with a current limit. For exemplary purposes, however, then invention will be described herein as operating with a CCCV power supply having an output characteristic similar to that shown in FIG. 2. Additionally, it will be obvious to those of ordinary skill in the art that the invention could equally be applied to power supplies without a limited current, provided that software with a programmable pseudo-limit were included with the charger. Such a pseudo-limit would be such that the charger's internal components would be protected for any current up to the pseudo-limit.

Figure 3:
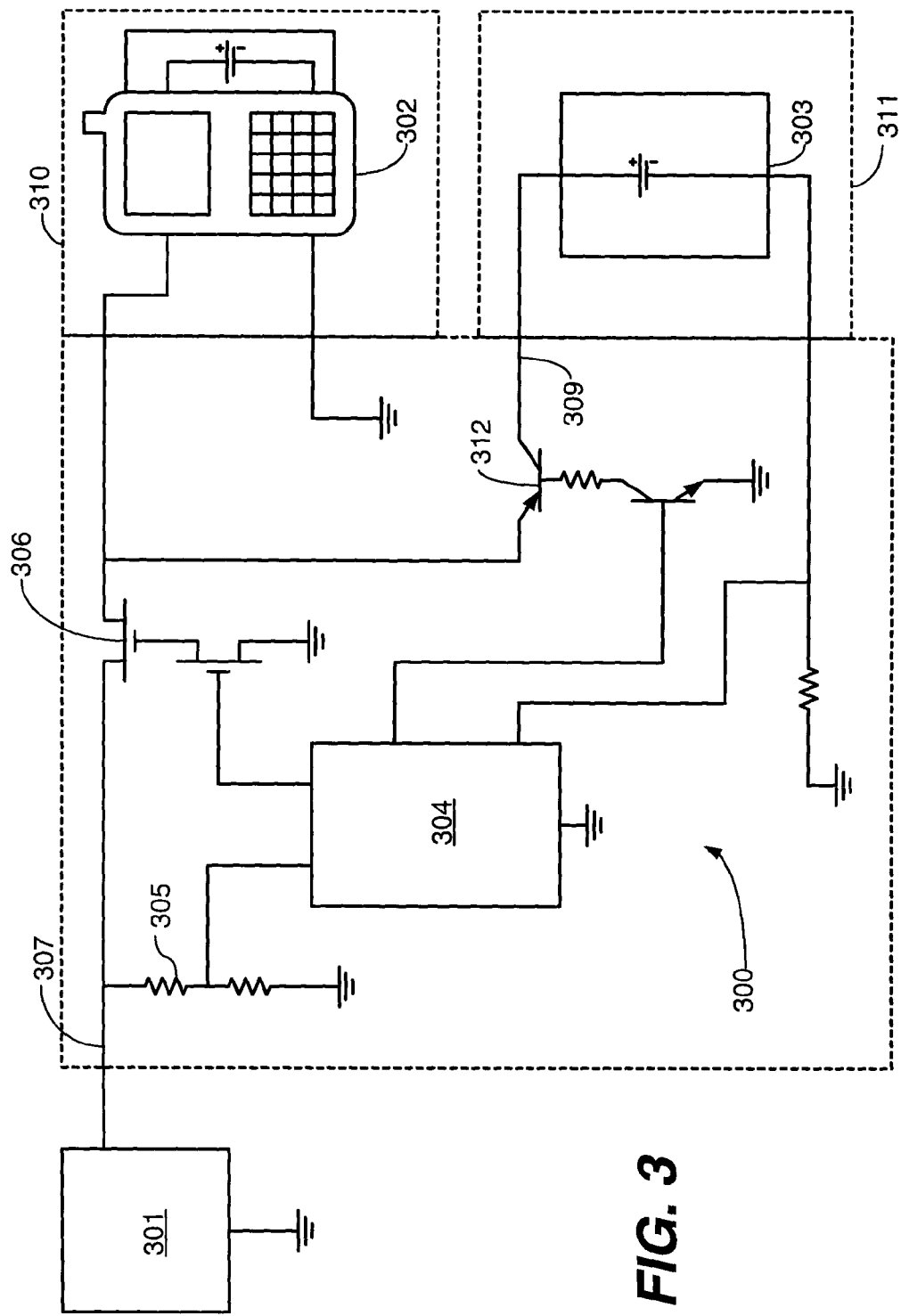
FIG. 3 illustrates one preferred embodiment of a charging circuit in accordance with the invention

Referring now to FIG. 3, illustrated therein is one preferred embodiment of a circuit in accordance with the invention. The circuit 300 provides a current arbitration function from a single power source 301 to a plurality of loads 302,303. In other words, the circuit 300 determines how much energy is delivered from the power source 300 to each load 302,303.

The circuit 300 includes means for coupling to the power source 307, as well as means for coupling to a plurality of loads 308,309. Note that while the embodiment shown in FIG. 3 includes two loads, the invention could be easily extended to include any number of loads. The means for coupling to the power source 307 may be as simple as a copper trace, where the power source 301 is internal, or may be an external connector for coupling to external power supplies. Likewise, the means for coupling to the loads 308,309 may simply be copper circuit board traces or internal connectors for integrated pockets 310,311, or may be more complex connectors for detachable pockets.

The circuit includes a controller 304 that acts as the nerve center of the circuit 300. The controller is preferably a microcontroller, like one of the 8-bit, KOS microcontrollers manufactured by NEC, although other devices, including smart battery management devices and programmable logic devices, to name a few, will also suffice. The controller 304 is coupled to a means for sensing the voltage of the single power source, illustrated herein as a resistor divider 305 that scales the output of the power source 301 to a level within the input limits of an Analog to Digital (A/D) converter in the controller 304.

The controller 304 is also coupled to a means of decoupling the power source from the plurality of loads, illustrated here as a transistor 306. Other devices, including switches, relays, and the like, may be substituted for the transistor 306. The transistor 306 acts as a switch means, in that the controller 304 is able to either open or close the transistor 306, thereby coupling or decoupling the power source 301 with the loads 302,303.

When the circuit 300 is initially activated, either by way of turning the circuit 300 on or by coupling a power source 301 to the circuit 300, the controller 304 decouples the power source 301 from the loads 302,303 by opening the transistor 306. With the transistor 306 open, the controller is able to measure the open circuit voltage of the power source 301 through the resistor divider 305. The controller 304 records this open circuit voltage in memory as the base line voltage of the unloaded power source 304.

From this base line, the controller 304 defines a threshold voltage. This threshold voltage is less than or equal to the base line. The threshold voltage is essentially the minimum voltage that the power supply will deliver while still in the constant voltage mode. As power supplies have varying tolerances, this voltage will vary from design to design. Additionally, this tolerance will vary based upon the size of the power supply. For low power, i.e. less than 10 watts, the threshold may be anywhere from 10 millivolts to as much as 1 volt below the base line. In one preferred embodiment for cellular telephone applications, the threshold is 600 mV below the base line.

Once the threshold voltage has been established, it is stored within the memory of the controller 304. The circuit 300 then attempts to deliver as much current as possible to each load 302,303 without causing the power source voltage to fall below the threshold voltage. In other words, to deliver as much power as possible, the controller 304 will pull as much current as possible from the power source 301, to the load, until the power source 301 just enters the constant current mode.

Current delivery to the first load 302 is accomplished by the dedicated means for coupling to the first load 308. This connection is "dedicated" because the first load 302 has priority in this exemplary embodiment. For example, if the first load 302 comprises a cellular telephone, and the second load comprises a rechargeable battery only, most users would want the cellular telephone to take priority over the battery in the event that a charge conflict arises. As such, this connection is dedicated. Note that the cellular telephone may include its own, internal, charging circuitry.

The connection to the second load 303, however, is by way of a current regulator 312, illustrated here as a transistor operating in its linear, or ohmic, region. The current regulator 312 is coupled serially between the power source 301 and the second load 303. The current regulator 312 provides a way for the controller 304 to limit the amount of current flowing to the second load 303. For non-priority applications, as well as programmably prioritizable applications, a current regulator may be serially coupled to the first load 302 as well.

Once the threshold voltage has been established, the controller 304 closes transistor 306, thereby allowing current to flow to the first load 302. The controller then actuates the current regulator 312, thereby increasing the current flowing to the second load 303. All the while, the controller 304 is sensing the voltage of the power source 301. As long as the voltage of the power source is above the threshold voltage, the controller 304 will continue to increase the amount of current flowing to the second load 303.

When the voltage of the power source falls below the threshold voltage, however, the controller 304 will reduce the amount of current flowing to the second load. Thus, a closed feedback loop is created wherein the sum of the currents flowing to the loads 302,303 is roughly equal to the amount of current deliverable by the power source 301 just prior to entering the constant current stage wherein the output voltage would drop. The net result is maximum power delivery to the loads 302,303 while still maintaining first load priority.

Figure 4:
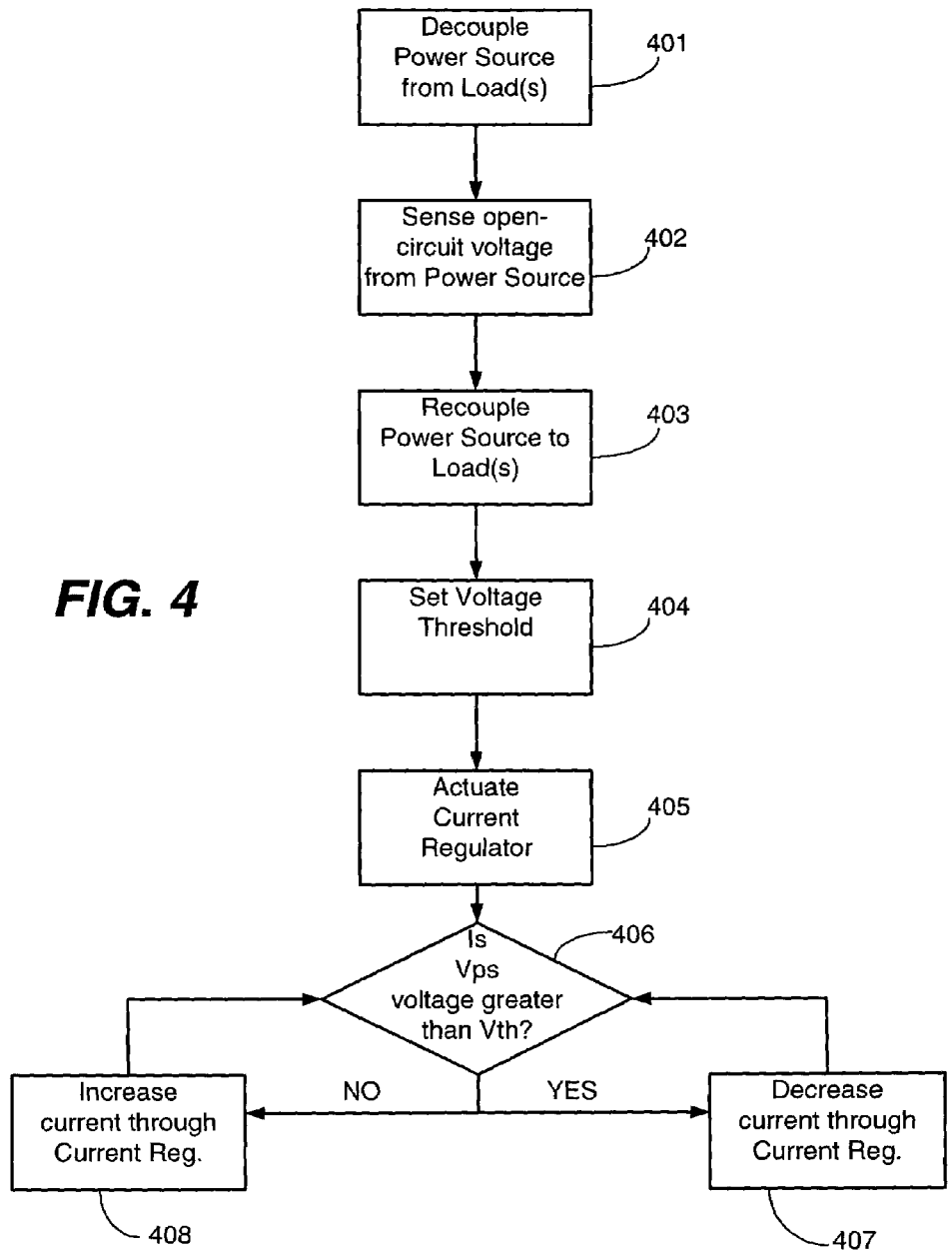
FIG. 4 illustrates a method in accordance with the invention for 37 CFR 1.83 purposes.

A summary of the method used by the controller 304 is illustrated in FIG. 4. At step 401, the controller decouples the power source from the loads. At step 402, the controller senses and records the open circuit voltage of the power source. The power source is recoupled to the loads at step 403. The controller then sets the threshold voltage at step 404, and actuates the current regulator at step 405. The controller continually senses the power source voltage, checking to see whether it is above or below the threshold voltage at decision 406. When the power source voltage is above the threshold voltage, the controller increases current (step 407), and when the power source voltage falls below the threshold voltage, the controller decreases current (step 408).

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been illustratively shown herein as a charger with two pockets, it will be clear that the invention could be extended to any number of loads, either prioritized with dedicated connections, or programmably prioritizable by including current regulators coupled serially with the loads.

What is claimed is:

1. A circuit for arbitrating current from a single power source to a plurality of loads, the circuit comprising:
   a. a means of sensing a voltage of the single power source;
   b. a means of regulating current to at least a second load;
   c. a means of decoupling the single power source from the plurality of loads; and
   d. a control means coupled to the means for sensing voltage and the means for regulating current;
   wherein when the means for decoupling is actuated, the control means defines an open-circuit power supply voltage.

2. The circuit of claim 1, wherein the control means defines a threshold voltage, wherein the threshold voltage is equal to or less than the open-circuit power supply voltage.

3. The circuit of claim 2, wherein the control means causes the means of regulating current to supply as much current as possible to the at least a second load while maintaining a voltage from the single power source that is greater than or equal to the threshold voltage.

4. A circuit for delegating current to a plurality of loads, the circuit comprising:
   a. a means for coupling to a power source;
   b. a means for coupling to the plurality of loads, the plurality of loads comprising at least a flint load and at least a second load;
   c. a switch means coupled serially between the means for coupling to a power source and the means for coupling to a plurality of loads;
   d. a means for regulating current coupled serially between the means for coupling to a power source and the at least a second load;
   e. a means for sensing a voltage of the power source; and
   f. a control means coupled to both the switch means and the means for regulating current.

5. The circuit of claim 4, wherein when the switch means is open, the control means records the voltage of the power source by way of the means for sensing a voltage of the power source.

6. The circuit of claim 5, wherein the control means defines a threshold voltage upon sensing the voltage of the power supply.

7. The circuit of claim 6, wherein the threshold voltage is less than or equal to the sensed voltage of the power supply.

8. The circuit of claim 7, wherein the threshold voltage is between 10 and 1000 millivolts below the recorded voltage of the power source.

9. The circuit of claim 6, wherein the control means actuates the means for regulating current and reduces the current flowing to the at least a second load when the voltage of the power source falls below the threshold voltage.

10. The circuit of claim 9, wherein the control means increases the current flowing to the at least a second load when the voltage of the power source is above the threshold voltage.

11. The circuit of claim 10, wherein the at least a second load comprises a rechargeable battery.

12. A method of delegating current to a plurality of loads, the method comprising the steps of:
   a. decoupling a power source from the plurality of loads;
   b. sensing an open-circuit power source voltage;
   c. coupling the power source to the plurality of loads;
   d. establishing a threshold voltage;
   e. actuating a current regulator to provide current to at least a second of the plurality of loads;
   f. reducing the current to teat least a second of the plurality of loads whenever an output voltage of the power source falls below the threshold voltage.

13. The method of claim 12, further comprising the step of increasing the current to the at least a second load when the output voltage of the power source is above the threshold voltage.

14. The method of claim 13, wherein teat least a second load comprises a rechargeable battery.

* * * * *

UNITED STATES PATENT AND TRADEMARK OFFICE
CERTIFICATE OF CORRECTION

PATENT NO. : 6,967,467 B2  
DATED : November 22, 2005  
INVENTOR(S) : Riley et al.

It is certified that error appears in the above-identified patent and that said Letters Patent is hereby corrected as shown below:

Column 6,
Line 5, delete "flint" and replace with -- first --.

Signed and Sealed this

Thirty-first Day of January, 2006

JON W. DUDAS  
*Director of the United States Patent and Trademark Office*